US007924541B2

(12) United States Patent
Zhang

(10) Patent No.: US 7,924,541 B2
(45) Date of Patent: Apr. 12, 2011

(54) POWER PLUG WITH LEAKAGE CURRENT PROTECTION FUNCTION

(76) Inventor: Long Zhang, Shanghai (CN)

( * ) Notice: Subject to any disclaimer, the term of this patent is extended or adjusted under 35 U.S.C. 154(b) by 750 days.

(21) Appl. No.: 11/170,034

(22) Filed: Jun. 29, 2005

(65) Prior Publication Data

US 2006/0061924 A1 Mar. 23, 2006

(30) Foreign Application Priority Data

Sep. 22, 2004 (CN) ...................... 2004 2 0096315 U

(51) Int. Cl.
*H02H 3/08* (2006.01)

(52) U.S. Cl. ...................................................... 361/93.1

(58) Field of Classification Search .................... 361/42, 361/93.1

See application file for complete search history.

(56) References Cited

U.S. PATENT DOCUMENTS 3,996,496 A 12/1976 Volk, Jr.
4,205,358 A 5/1980 Washington
4,580,186 A 4/1986 Parker et al.
4,858,056 A 8/1989 Russell
4,931,894 A 6/1990 Legatti
4,947,278 A 8/1990 Nichols, III
4,979,090 A 12/1990 Huss et al.
5,065,104 A 11/1991 Kusko et al.
5,142,428 A 8/1992 Takeda
5,237,480 A 8/1993 Dara
5,418,678 A * 5/1995 McDonald ...................... 361/46
5,600,524 A 2/1997 Neiger et al.
5,661,623 A 8/1997 McDonald et al.
5,694,280 A * 12/1997 Zhou ............................... 361/45
5,774,316 A 6/1998 McGary et al.
5,847,913 A 12/1998 Turner et al.
5,889,643 A 3/1999 Elms
6,014,297 A 1/2000 Clarey et al.
6,057,996 A 5/2000 Kim
6,091,591 A 7/2000 Heinz et al.
6,111,732 A 8/2000 Beland
6,111,733 A 8/2000 Neiger et al.
6,262,871 B1 7/2001 Nemir et al.
6,414,829 B1 * 7/2002 Haun et al. ....................... 361/42
6,504,691 B1 1/2003 Matsui et al.
6,525,914 B1 2/2003 Legatti
6,535,914 B1 * 3/2003 Pearson et al. ................ 709/220
6,697,238 B2 2/2004 Bonilla et al.
2004/0070899 A1 * 4/2004 Gershen et al. ................. 361/42
2006/0146456 A1 * 7/2006 Williams ........................ 361/42

OTHER PUBLICATIONS

Derwent abstract of KR2004064828A (Short protection circuit for magnetic-tpype ballast for high intensity discharge lamp) by G. J. Kim, Jul. 21, 2004.*

* cited by examiner

*Primary Examiner* — Jared J Fureman
*Assistant Examiner* — Nicholas Ieva
(74) *Attorney, Agent, or Firm* — Chen Yoshimura LLP

(57) ABSTRACT

A power plug having leakage current protection function is disclosed. The power plug includes a changeover mechanism for making and breaking electrical connection between the input (line) and output (load) side of the plug, and a control circuit for detecting a leakage current and a short circuit. A reset button and a test button are provided. When the reset button is pressed, a reset shaft operates the changeover mechanism to achieve electrical connection between the input and output sides. When there is a current leakage, a short circuit or other abnormal conditions at the output side of the plug (or the input side of the appliance connected to the plug), the control circuit generates a signal to operate the changeover mechanism to electrically disconnect the input and output sides. The test button can simulate a short circuit to electrically disconnect the input and output sides.

11 Claims, 7 Drawing Sheets

POWER PLUG WITH LEAKAGE CURRENT PROTECTION FUNCTION

BACKGROUND OF THE INVENTION

1. Field of the Invention

This invention relates to power plugs, and in particular, a power plug having leakage current protection function.

2. Description of the Related Art

With the increasing use of household electrical appliances, more attention is being paid to the safety of using such appliances. Conventional power plugs have a simple structure and lack various protection functions. A conventional power plug typically has a body and two or three insertion prongs extending from the body, one end of the prongs being connected by electrical conductors to the power input of the relevant circuit within the appliance. In use, the prongs of the plug are inserted into a power outlet in a wall (which may or may not have leakage current protection functions) to provide the power from the outlet to the circuit of the appliance (load). Such a conventional power plug has the simple function of providing power to the load, but does not provide any protection against unsafe conditions such as current leakages between the phase and neutral conductors, or shorts and arcing between the phase and neutral conductors in the power outlet, which can cause damage to the appliance.

SUMMARY OF THE INVENTION

Accordingly, the present invention is directed to a power plug device that substantially obviates one or more of the problems due to limitations and disadvantages of the related art.

An object of the present invention is to provide a power plug having a leakage current protection function.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a power plug including a body, neutral and phase conductor prongs partially disposed within the body and extending therefrom, output neutral and phase wires, a reset button partially exposed from the body, a reset shaft disposed within the body and coupled to the reset button, a changeover mechanism disposed within the body for making or breaking electrical connections between the neutral and phase conductor prongs and the output neutral and phase wires, respectively, and a circuit board disposed within the body and having a leakage current and short circuit detection circuit. The changeover mechanism includes a disconnect mechanism, a pair of moveable members (contact levers) electrically connected respectively to the output neutral and phase wires and moveable by the disconnect mechanism, and a coil having a core coupled to the disconnect mechanism. The leakage current and short circuit detection circuit is connected to the coil to energize the coil in response to detecting a leakage current or a short circuit on an output side of the plug. The disconnect mechanism has a first position in which the pair of moveable members are electrically disconnected respectively from the neutral and phase conductor prongs, and a second position in which the pair of moveable members are electrically connected respectively to the neutral and phase conductor prongs, and wherein the reset shaft and the core cooperate with the disconnect mechanism to cause it to move from the first position to the second position when the reset button is pressed and to move from the second position to the first position when the coil is energized.

The power plug may additionally include a shield line of the output neutral and phase wires, the shield line being connected to the leakage current and short circuit detection circuit. The leakage current and short circuit detection circuit includes a photo coupler IC and a silicon-controlled rectifier (SCR), an input of the photo coupler IC being connected to the shield line and an output of the photo coupler IC being connected to a gate of the SCR, the SCR supplying a current to the coil when the SCR is in a conductive state.

The power plug may additionally include a test button partially exposed from the body. The leakage current and short circuit detection circuit further includes a test switch operable by the test button, the test switch being connected to the input of the photo coupler IC.

The power plug may additionally include a ground conductor prong extending from the body for electrically connecting to the ground.

It is to be understood that both the foregoing general description and the following detailed description are exemplary and explanatory and are intended to provide further explanation of the invention as claimed.

DETAILED DESCRIPTION OF THE PREFERRED EMBODIMENTS

Figure 1:
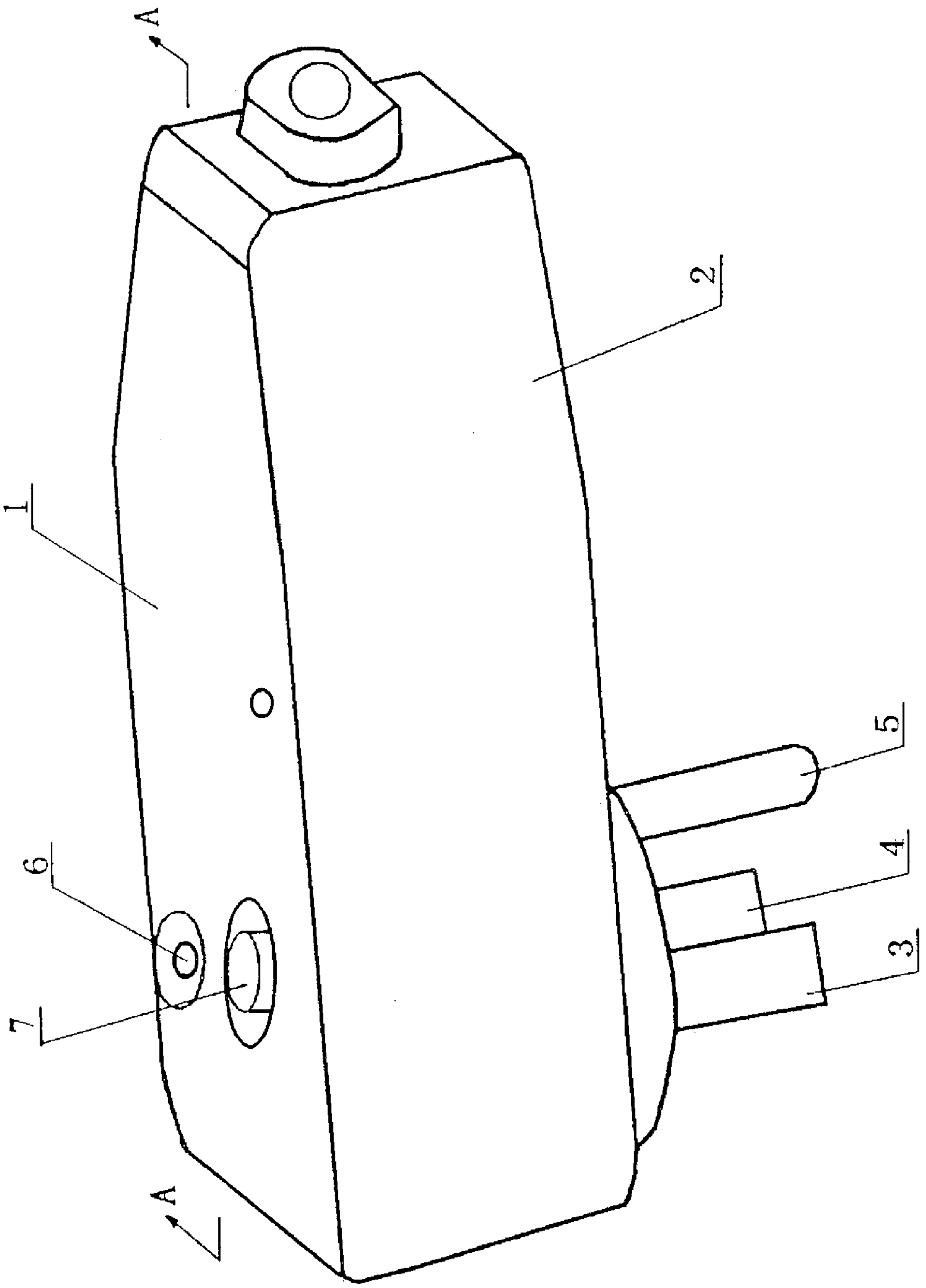
FIG. 1 is an exterior perspective view of a power plug according to an embodiment of the present invention.

According to embodiments of the present invention, a power plug having leakage current protection function includes a body and neutral and phase (hot) conductor prongs extending from the body. The power plug is provided with a changeover mechanism disposed inside the body for making and breaking electrical connection, and a control circuit board for detecting leakage current and short circuit.

The body is composed of a cover and a base. The cover accommodates a reset button. The neutral and phase conductor prongs extend from the base. One end of each of the neutral and phase conductors is exposed outside of the body, and the other end passes through the base and the circuit board into the body. Stationary contact terminals are provided on the neutral and phase conductor prongs inside the body.

The changeover mechanism includes a disconnect mechanism, a pair of moveable contact levers, and a coil having a disconnect core. The disconnect mechanism is located between the neutral and phase conductor prongs and the coil.

The disconnect mechanism has a hole in the middle for accommodating a reset shaft that is coupled to the reset button. The disconnect mechanism has two side arms, and the two moveable contact levers are located above the two side arms. An L shaped lock member is slidably disposed through the disconnect mechanism. The top portion of the L shaped lock member has a hole, and the side portion of the lock member is coupled to the disconnect core of the coil. A moveable contact terminal is provided on one end of each moveable contact lever and corresponds to the stationary contact terminal on the phase and neutral conductor prongs, respectively. The other end of each moveable contact lever is fixed on the control circuit board and electrically connected to the phase and neutral lines on the board, respectively. The reset shaft is located under the reset button and a reset spring is disposed between the lower end of the reset shaft and the base. The reset shaft has a groove for engaging the L shaped lock member.

One end of the disconnect core is coupled to the side portion of the L shaped lock member, and another end is located inside the coil with a disconnect spring disposed at that end of the core. The two terminals of the coil are connected to the circuit board, and are electrically connected to the output (load side) phase and neutral wires on the circuit board through a silicon-controlled rectifier (SCR). The gate of the SCR is connected to the output of a leakage current and short circuit detection circuit.

The cover of the plug body additionally accommodates a test button. One end of the test button passes through the cover, and the other end is coupled to a test switch that is electrically connected on the circuit board. The leakage current and short circuit detection circuit includes the test switch, diodes, a photo coupler IC, the silicon-controlled rectifier SCR and a reset switch. One end of the test switch is connected through a resistor to the phase wire of the load (output) side of the power plug; the other end of the test switch is connected to the neutral wire of the load side through a light emitting diode at the input side of the photo coupler and a diode. A transistor at the output side of the photo coupler provides a trigger voltage to the gate of the SCR. The anode of the SCR is connected to the phase wire of the load side of the plug through the coil; the cathode of the SCR is connected to the neutral wire of the load side through a resistor. The input end of the photo coupler is connected to a shield line of the output (load side) wires of the power plug.

The power plug additionally includes a ground conductor prong for connecting to the ground through conductors.

Figure 2:
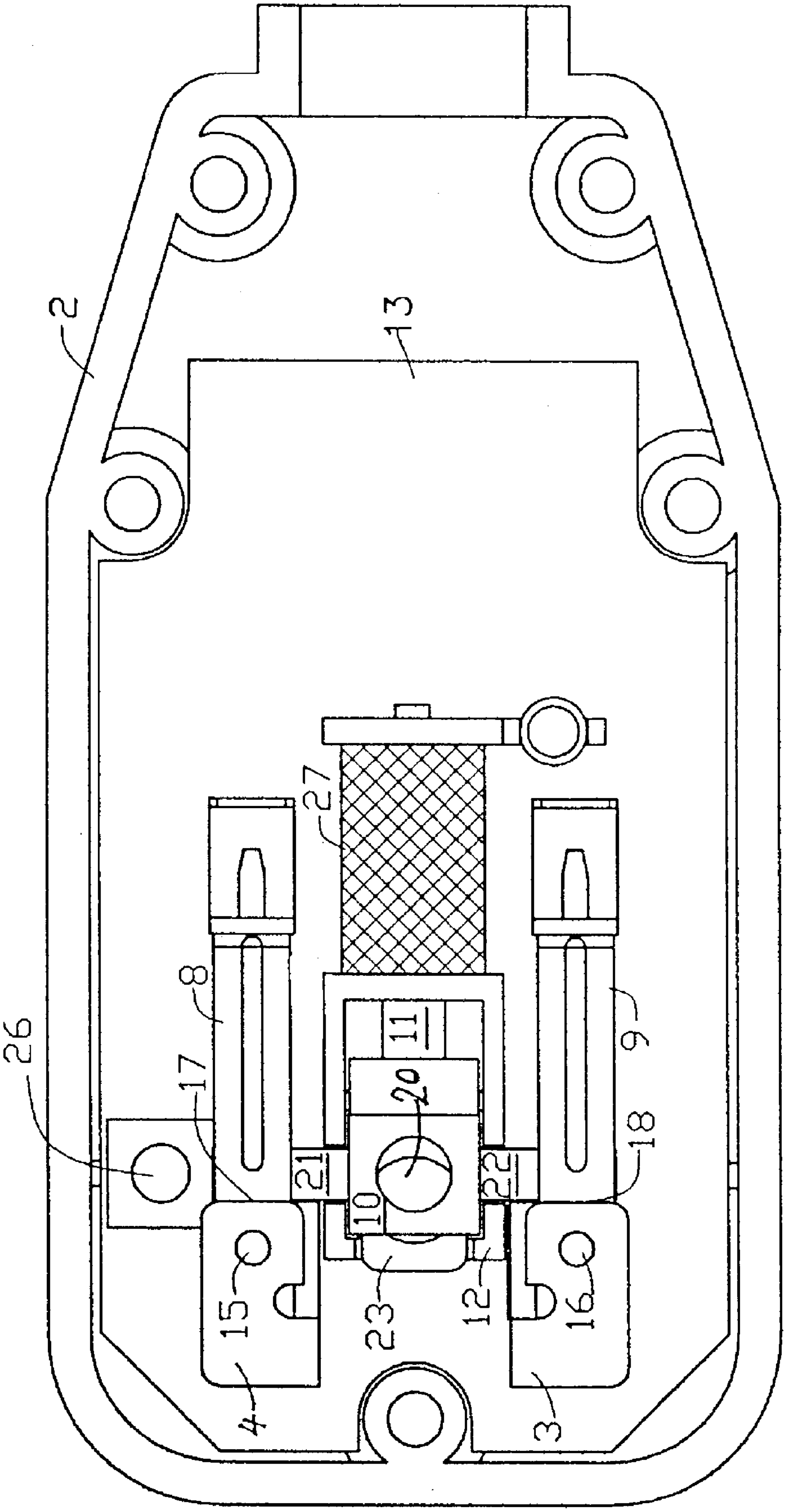
FIG. 2 is illustrates the structure of the power plug of FIG. 1 with the top cover removed.

A power plug according to embodiments of the present invention is now described in more detail with reference to the drawings. As shown in FIGS. 1 and 2, the power plug includes a body, neutral, phase (hot) and ground conductor prongs 3, 4 and 5 extending from the body, a changeover mechanism disposed inside the body for making electrical connection, and a control circuit board 13 for detecting leakage current and short circuit conditions.

As shown in FIG. 1, the body is composed of a cover 1 and a base 2. The cover 1 accommodates a reset button (RESET) 7 and a test button (TEST) 6. The three conductor prongs 3, 4 and 5 extend from the base 2. As shown in FIGS. 1 and 2, one end of each of neutral conductor 3 and phase conductor 4 is exposed outside of the body, and the other end passes through the base 2 and the circuit board 13 into the body. Stationary contact terminals 16, 15 are provided on the neutral and phase conductors 3 and 4, respectively.

As shown in FIG. 2, the changeover mechanism includes a disconnect mechanism 10, a pair of moveable contact levers 8, 9, and a coil 27 having a disconnect core 11. The disconnect mechanism 10 is located between the neutral and phase conductors 3, 4 and the coil 27. The moveable contact levers 8, 9 are located above two side arms 21, 22 of the disconnect mechanism 10. A moveable contact terminal 17 is provided on one end of the moveable contact lever 8 and corresponds to the stationary contact terminal 15 on the phase conductor 4, and a moveable contact terminal 18 is provided on one end of the moveable contact lever 9 and corresponds to the stationary contact terminal 16 on the neutral conductor 3. The other end of each moveable contact lever is fixed on the control circuit board 13 and electrically connected respectively to the phase and neutral lines on the board 13.

Figure 3:
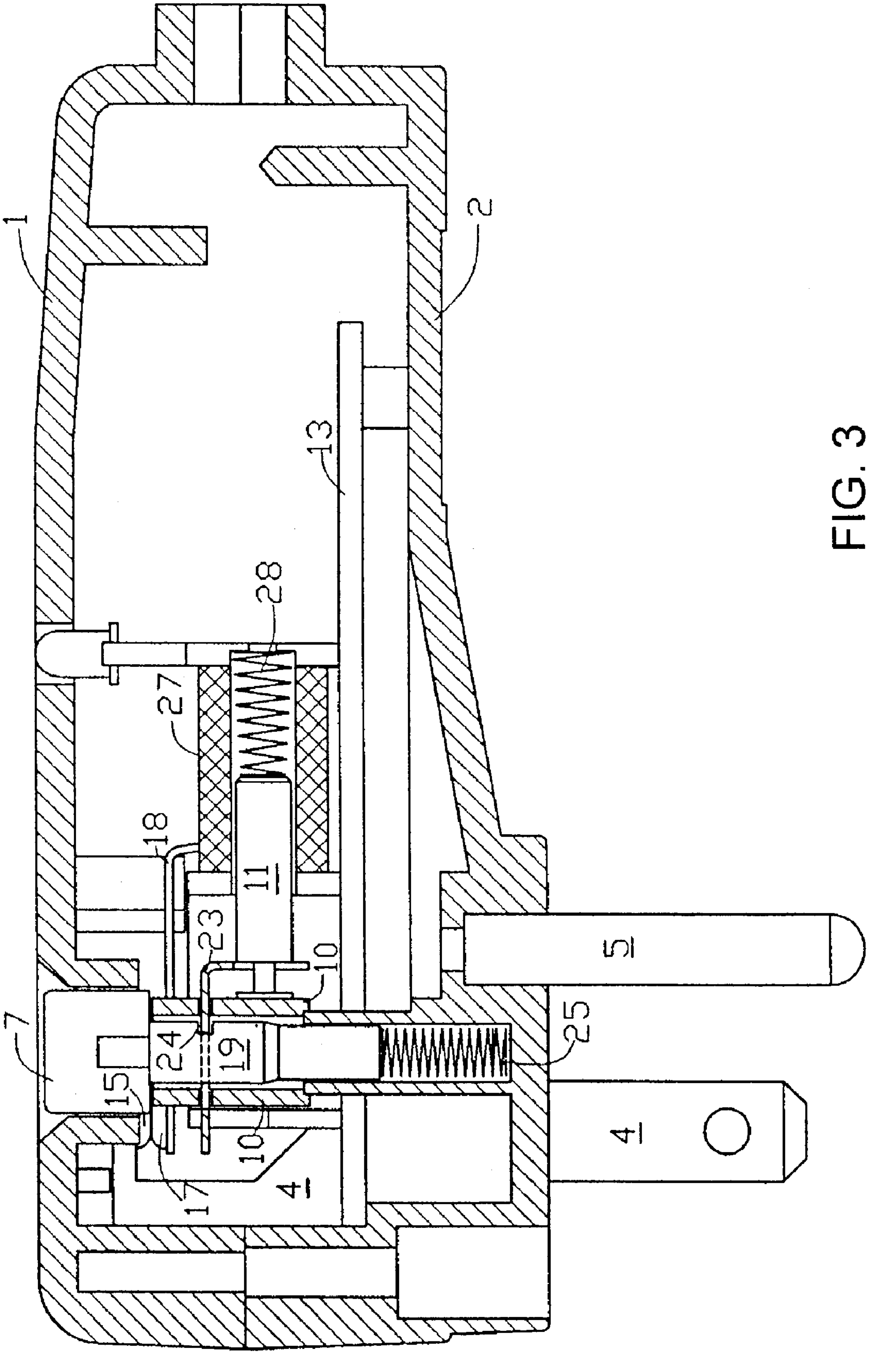
FIG. 3 is a cross-sectional view of the power plug of FIG. 1 viewed along the line A-A, illustrating a state of the power plug after a reset operation and when the input (line) side and output (load) side are electrically connected.

As shown in FIGS. 2 and 3, the disconnect mechanism 10 is centrally located with respect to the neutral and the phase conductors 3, 4, the moveable contact levers 8, 9, and the coil 27. The disconnect mechanism 10 has a hole 20 in the middle for accommodating a reset shaft 19 that is coupled to the reset button 7. Side arms 21, 22 extend on two sides of the disconnect mechanism 10, and the moveable contact levers 8, 9 are located above (as seen in the view of FIG. 3) the side arms 21, 22. An L shaped lock member 23 is slidably disposed through the disconnect mechanism 10. The top portion of the L shaped lock member 23 has a hole, and the side portion of the lock member 23 is coupled to the disconnect core 11 of the coil 27. The core 11 can cause the lock member 23 to move laterally as viewed in the view of FIGS. 2 and 3.

The reset shaft 19 is located under the reset button 7, and has a groove 24 for receiving the lock member 23. A reset spring 25 is disposed between the lower end of the reset shaft 19 and the base 2.

One end of the disconnect core 11 has a slot to couple it to the side portion of the L shaped lock member 23, and the other end of the core is located inside the coil 27 with a disconnect spring 28 disposed at that end. The two terminals of the coil 27 are connected to the circuit board 13, and are electrically connected to the output phase and neutral wire on the board 13 through a silicon-controlled rectifier (SCR) as shown in FIG. 5.

Figure 5:
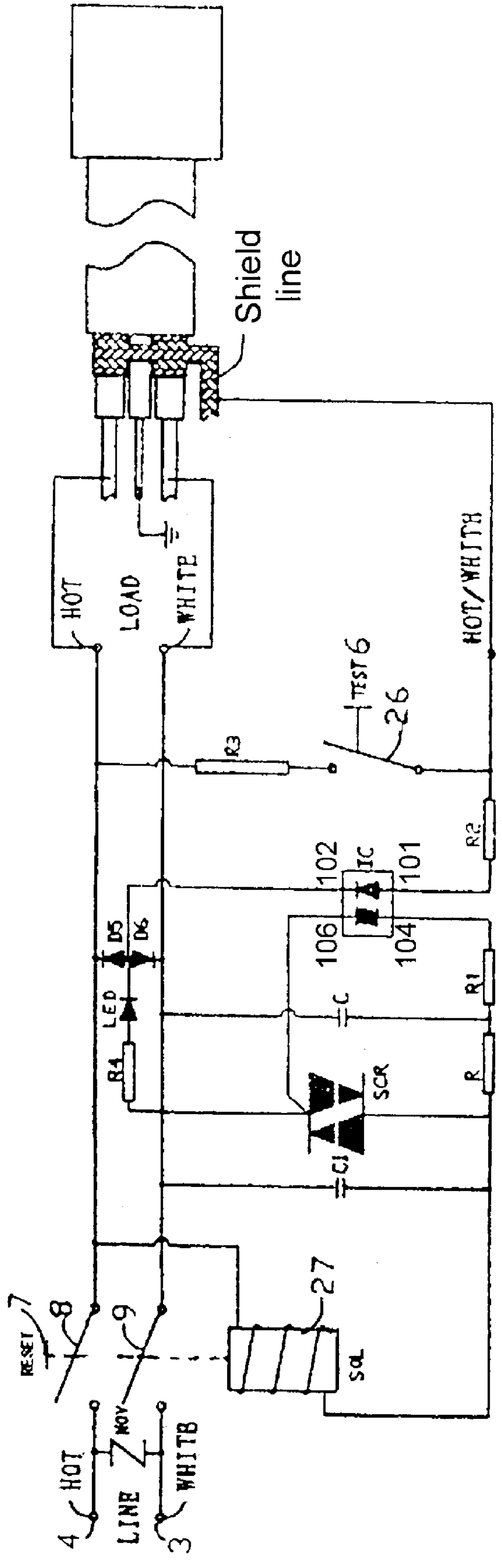
FIGS. 5, 6 and 7 are circuit diagrams showing alternative leakage current and short circuit detection circuits according to embodiments of the present invention.

One end of the test button 6 passes through the cover 1, and the other end is coupled to a test switch 26 which is electrically connected on the circuit board 13 (see FIG. 5).

FIG. 5 is a circuit diagram of the control circuit of the power plug according to embodiments of the present invention. A shown, a leakage current and short circuit detection circuit according to embodiments of the present invention includes the test switch 26, diodes D5, D6, a photo coupler IC, a bi-direction silicon-controlled rectifier SCR and a reset switch 7. One end of the test switch 26 is connected through a resistor R3 to the phase (HOT) wire of the load side (LOAD) of the power plug; the other end of the test switch 26 is connected to the neutral (WHITE) wire of the load side (LOAD) through the light emitting diode at the input side of the photo coupler and the diode D6. The transistor at the output side of the photo coupler provides a trigger voltage to the gate electrode of the bi-direction silicon-controlled rectifier SCR. One end of the bi-direction silicon-controlled rectifier SCR is connected to the phase (HOT) wire of the load (LOAD) side of the plug through the coil 27; the other end of the SCR is connected to the neutral (WHITE) wire of the load (LOAD) side through a resistor R4 and the diode D6.

Figure 6:
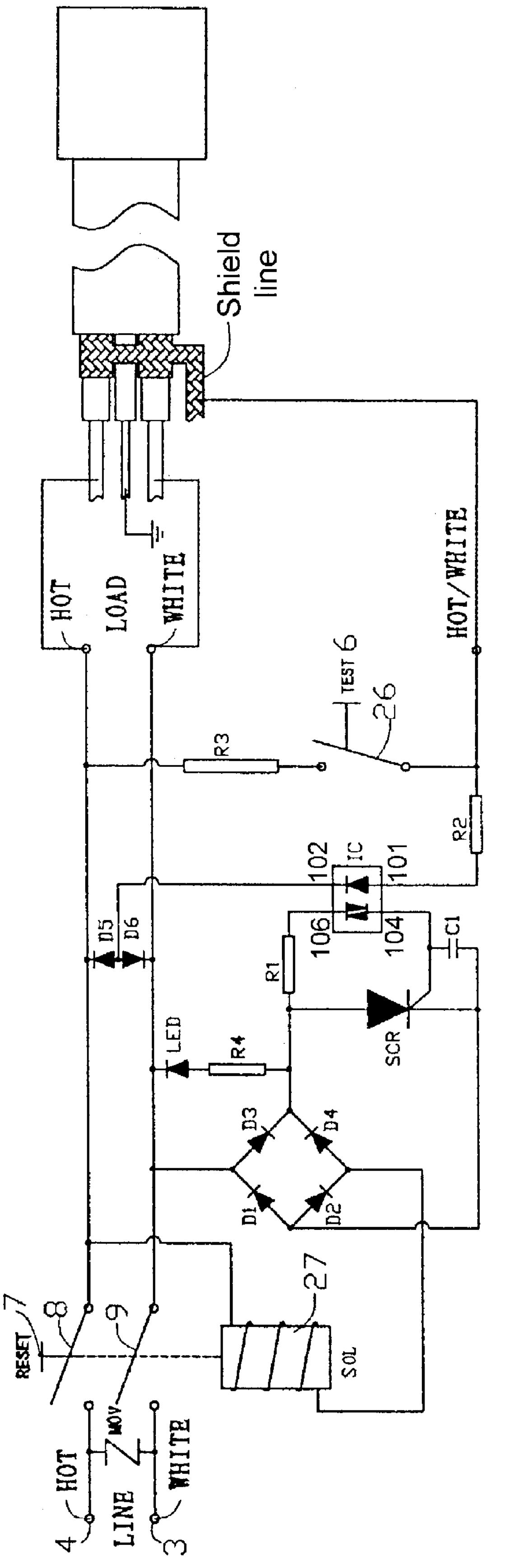
Figure 7:
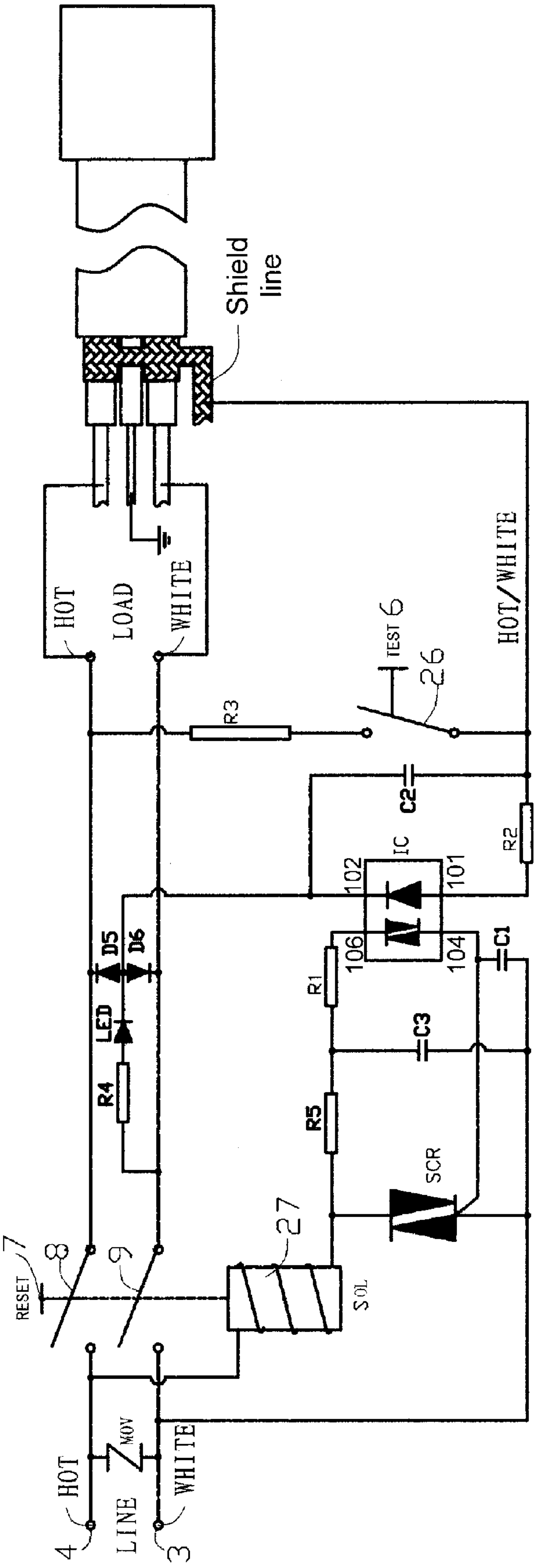

FIGS. 6 and 7 are circuit diagrams of alternative control circuits according to alternative embodiments of the present invention. Since the structures of the alternative circuits are apparent from the circuit diagrams and their operation principle is similar to that of the circuit diagram shown in FIG. 5, detailed descriptions are omitted here.

To detect a current leakage between the output phase and neutral wires of the power outlet into which the power plug is plugged, the input end of the photo coupler, i.e., terminal 101, is connected to a shield line of the output wires of the power plug (see FIGS. 5-7).

Figure 4:
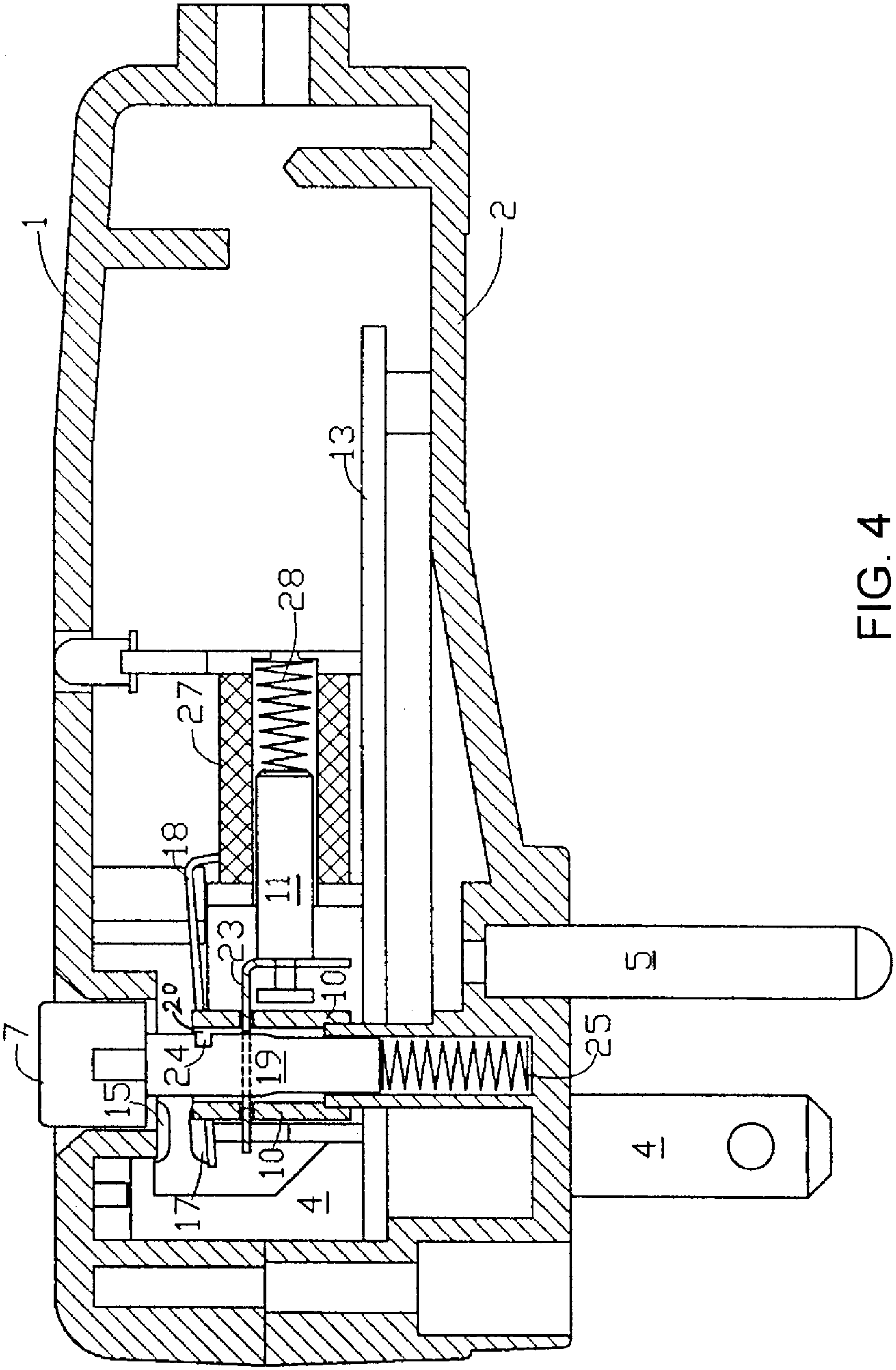
FIG. 4 is a cross-sectional view of the power plug of FIG. 1 viewed along the line A-A, illustrating a state of the power plug after a leakage current or short circuit is detected and when the input and output sides are electrically disconnected.

The operation principle of the power plug according to embodiments of the present invention is describe with reference to FIGS. 3, 4 and 5.

As shown in FIGS. 3 and 5, when the reset button 7 is pressed, the lock member 23 slides into the groove 24 on the reset shaft 19. When the reset button is subsequently released, the reset spring 25 urges the reset shaft 19 upward, bringing the disconnect mechanism 10 upward. As a result, the moveable contact levers 8, 9 disposed above the side arms 21, 22 move upwards, causing the moveable contact terminals 17, 18 to come into contact with the stationary contact terminals 16, 15 on the neutral and phase conductors 3, 4. This electrically connects the input to the output of the power plug.

When electrical connection between the input (LINE) and the output (LOAD) side of the power plug is to be broken, the test button 6 is pressed to close the switch 26. As shown in FIG. 5, a current path is formed between the phase (HOT) and neutral (WHITE) wires on the output (LOAD) side of the plug through resistors R3, R2, terminals 101 and 102 of the photo coupler IC, and diode D6. The action of the photo coupler causes electrical conduction between the photo coupler output terminals 104 and 106. This triggers the SCR to become conductive, supplying a current to energize the coil 27. The magnetic field generated by the coil 27 causes the core 11 to move the lock member 23 laterally, thereby releasing the reset shaft 19 that has been locked at the groove 24 by the lock member 23. As a result, the disconnect mechanism 10 is lowered, together with the side arms 21, 22. The moveable contact levers 8, 9 is also lowered, causing the moveable contact terminals 17, 18 to separate from the stationary contact terminals 16, 15 on the neutral and phase conductors 3, 4, thereby electrically disconnecting the input and output sides of the power plug.

Similarly, when the input of the equipment connected to the plug has a current leakage or short circuit at the phase or neutral wires, the leakage current on the shield lines form a current path through resistor R2, terminals 101, 102 of the photo coupler IC, and diodes D5 and D6 alternately. The action of the photo coupler causes electrical conduction between the photo coupler output terminals 104 and 106. This triggers the SCR to become conductive, supplying a current to energize the coil 27. The magnetic field generated by the coil 27 causes the core 11 to move the lock member 23 laterally, thereby releasing the reset shaft 19 that has been locked at the groove 24 by the lock member 23. As a result, the disconnect mechanism 10 is lowered, together with the side arms 21, 22. The moveable contact levers 8, 9 is also lowered, causing the moveable contact terminals 17, 18 to separate from the stationary contact terminals 16, 15 on the neutral and phase conductors 3, 4, thereby electrically disconnecting the input and output sides of the power plug.

It will be apparent to those skilled in the art that various modification and variations can be made in the power plug embodiment of the present invention without departing from the spirit or scope of the invention. Thus, it is intended that the present invention cover modifications and variations that come within the scope of the appended claims and their equivalents.

What is claimed is:

1. A power plug comprising:

a body;

neutral and phase conductor prongs partially disposed within the body and extending therefrom;

output neutral and phase wires;

a reset button partially exposed from the body;

a reset shaft disposed within the body and coupled to the reset button;

a changeover mechanism disposed within the body for making or breaking electrical connections between the neutral and phase conductor prongs and the output neutral and phase wires, respectively, the changeover mechanism including a disconnect mechanism, a pair of moveable members electrically connected respectively to the output neutral and phase wires and moveable by the disconnect mechanism, and a coil having a core coupled to the disconnect mechanism;

a circuit board disposed within the body and having a leakage current and short circuit detection circuit, the leakage current and short circuit detection circuit being connected to the coil to energize the coil in response to detecting a leakage current or a short circuit on an output side of the plug;

wherein the disconnect mechanism has a first position in which the pair of moveable members are electrically disconnected respectively from the neutral and phase conductor prongs, and a second position in which the pair of moveable members are electrically connected respectively to the neutral and phase conductor prongs, and wherein the reset shaft and the core cooperate with the disconnect mechanism to move it from the first position to the second position when the reset button is pressed and to move it from the second position to the first position when the coil is energized; and a shield line of the output neutral and phase wires, the shield line being connected to the leakage current and short circuit detection circuit, wherein the leakage current and short circuit detection circuit includes a photo coupler IC and a silicon-controlled rectifier (SCR), an input of the photo coupler IC being electrically connected to the shield line and an output of the photo coupler IC being electrically connected to a gate of the SCR to control conductivity of the SCR, the SCR supplying a current to the coil when the SCR is conductive.

2. The power plug of claim 1, wherein the neutral and phase conductor prongs each includes a stationary contact terminal, wherein the two moveable members are contact levers and each include a moveable contact terminal corresponding to the respective stationary contact terminal, wherein the disconnect mechanism includes a slidable lock member coupled to the core and capable of being engaged with or released from the reset shaft, and two side arms each disposed adjacent one of the moveable contact levers to move the moveable contact levers, and wherein when the reset button is pressed, the disconnect mechanism is engaged with the reset shaft and locked in the second position so that the moveable terminals contact the stationary terminals, and when the coil is energized, the disconnect mechanism is released from the engagement with the reset shaft so that the moveable terminals are separated from the stationary terminals.

3. The power plug of claim 1, wherein the output of the photo coupler IC provides a trigger voltage to the gate of the SCR capable of triggering the SCR to be conductive.

4. The power plug of claim 1, further comprising a test button partially exposed from the body, wherein the leakage current and short circuit detection circuit further includes a test switch operable by the test button, the test switch being connected to the input of the photo coupler IC.

5. The power plug of claim 1, further comprising a ground conductor prong extending from the body for electrically connecting to the ground.

6. A power plug comprising:

neutral and phase conductor prongs;

output neutral and phase wires;

a changeover mechanism for making or breaking electrical connections between the neutral and phase conductor prongs and the output neutral and phase wires;

a shield line disposed around the output neutral and phase wires; and a leakage current and short circuit detection circuit electrically connected to the shield line and the changeover mechanism for generating a signal to cause the changeover mechanism to break the electrical connections between the neutral and phase conductor prongs and the output neutral and phase wires in response to detecting a leakage current or a short circuit condition on the shield line, wherein the leakage current and short circuit detection circuit includes a photo coupler IC and a silicon-controlled rectifier (SCR), an input of the photo coupler IC being electrically connected to the shield line and an output of the photo coupler IC being electrically connected to a gate of the SCR to control conductivity of the SCR, the SCR supplying a current to the changeover mechanism when the SCR is conductive.

7. The power plug of claim 1, wherein the gate of the SCR is electrically de-coupled from the shield line.

8. The power plug of claim 6, wherein the gate of the SCR is electrically de-coupled from the shield line.

9. The power plug of claim 6, wherein the output of the photo coupler IC provides a trigger voltage to the gate of the SCR capable of triggering the SCR to be conductive.

10. A power supply device comprising:

input neutral and phase conductors;

output neutral and phase conductors;

a changeover mechanism for making or breaking electrical connections between the input neutral and phase conductors and the output neutral and phase conductors;

a shield line for sensing an abnormal condition; and a leakage current and short circuit detection circuit electrically connected to the shield line and the changeover mechanism for generating a signal to cause the changeover mechanism to break the electrical connections between the input neutral and phase conductors and the output neutral and phase conductors in response to detecting an abnormal condition on the shield line, wherein the leakage current and short circuit detection circuit includes a photo coupler IC and a silicon-controlled rectifier (SCR), an input of the photo coupler IC being electrically connected to the shield line and an output of the photo coupler IC being electrically connected to a gate of the SCR to control conductivity of the SCR, the SCR supplying a current to the changeover mechanism when the SCR is conductive.

11. The power supply device of claim 10, wherein the output of the photo coupler IC provides a trigger voltage to the gate of the SCR capable of triggering the SCR to be conductive.

* * * * *